United States Patent Office 3,545,285
Patented Dec. 8, 1970

3,545,285
ACCELERATION MEASUREMENT SYSTEM
Robert L. Hall, Marblehead, Mass., assignor to Massachusetts Institute of Technology, Cambridge, Mass., a corporation of Massachusetts
Filed Aug. 14, 1967, Ser. No. 660,317
Int. Cl. G01p 15/08
U.S. Cl. 73—517                                     5 Claims

ABSTRACT OF THE DISCLOSURE

A system for measuring the acceleration of a moving body along a preselected direction in which a pair of accelerometers are fixedly attached to the body so that the input axis of one accelerometer intersects the preselected direction at a first angle and the input axis of the second accelerometer intersects such direction at a second angle. Further, the accelerometers are so mounted that their input axes are and remain perpendicular to each other. The output signals from the accelerometers are utilized in an appropriate analog computation system to produce a measurement of the acceleration along such preselected direction.

---

Figure 1:
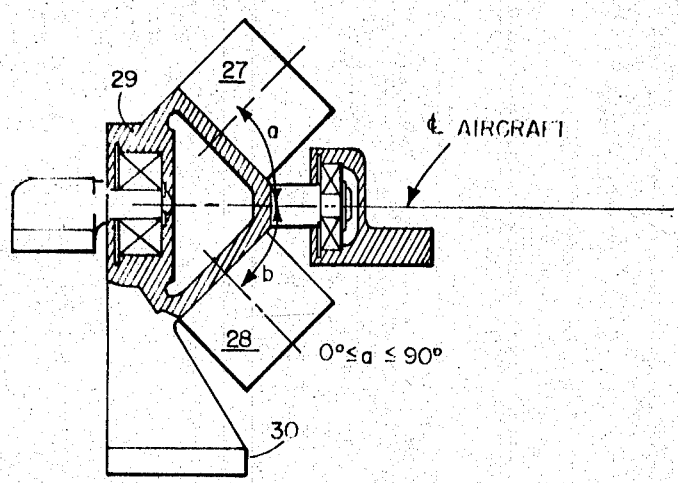

This invention relates generally to systems for measuring the acceleration of a moving body and, more particularly, to an improved system for measuring the acceleration of a body along a preselected direction when such body is subject to the effects of rotational motion about a specified axis as well as to the effects of acceleration due to gravity.

In measuring the acceleration of a moving body, such as the forward acceleration of the body as it moves in a preselected direction, conventional measurement systems usually utilize an accelerometer device whose input axis is coincident with or parallel to the central axis of the body. For example, if the forward acceleration of a moving aircraft is measured as the aircraft proceeds along a runway on its take-off run, the accelerometer may be located so that its input axis is aligned with the center line of the aircraft. If the aircraft is subject to a forward thrust providing an acceleration in the forward direction, the output signal from the accelerometer would normally represent the forward acceleration along such preselected direction provided the input axis is parallel with the forward direction of motion and provided the aircraft is not subjected to rotational or translational motions during the course of its run. In most practical situations, however, the aircraft's center line is not always maintained parallel to the direction of forward motion, the aircraft is subjected to motions which produce components of acceleration in different directions other than the forward direction and the aircraft is further subjected to the effects of a downward acceleration due to gravity. Because of these effects a measurement of the acceleration along the aircraft center line does not provide an accurate indication of the true forward acceleration of the aircraft.

Past attempts to reduce the inaccuracies which arise in such a single accelerometer measurement system have included the mounting of such accelerometer on a stabilized platform having an appropriate orientation with respect to the forward direction of travel of the aircraft so that the accelerometer input axis remains in a stabilized position along the forward horizontal direction substantially parallel to the runway surface. Such elaborate stabilized platform systems not only prove relatively costly to manufacture, install and maintain in operating condition, but also utilize space better used for other purposes. Such systems may also add undesirable weight to the aircraft.

The system of this invention avoids the use of such elaborate and expensive stabilized platform systems and, at the same time, provides an accurate measurement of acceleration in a preselected direction despite rotational motion of the body about a specified axis, such as the pitch axis of an aircraft. This invention may find use, for example, in a system for measuring an aircraft's forward acceleration during its take-off run such as is described in the copending patent application entitled "Aircraft Take-Off Monitoring System," Ser. No. 660,282, filed concurrently with this application by myself and Roland H. Siebens and assigned to a common assignee, which application describes a computer system for monitoring the take-off run of an aircraft. That particular system requires an accurate measurement of the forward acceleration of said aircraft in the direction of its take-off run along the surface of the runway.

In such a utilization of the invention, which is described herein as only one appropriate example of how the invention can be used in practice, the principal aircraft motion contributing to the inaccuracy of the acceleration measurement occurs when the aircraft rotates about its pitch axis, thereby projecting components of acceleration due to gravity into the accelerometer input axis. Rotations about the aircraft's roll axis under take-off conditions are usually minimal and detract little from the accuracy of the forward acceleration measurement. Even where such roll rotations are larger than may normally be expected, the effect of their presence can be relatively easily minimized as discussed below. Moreover, rotation about the aircraft's yaw axis, even if somewhat large, will have little effect on the forward acceleration measurement provided the acceleration measuring system is appropriately located in the aircraft, as discussed below. Moreover, translational components of acceleration in directions orthogonal to the forward direction will be small or essentially non-existent during a normal take-off run so that their effect similarly will be relatively small. An exception may occur in the case where the average runway slope is excessively large (i.e., more than a few degrees) and a noticeable vertical component of acceleration may be present. Since most runways tend to be relatively flat and horizontal, the presence of vertical acceleration components either will be small enough to have little or no effect on the accuracy of the acceleration measurement or can be compensated for by appropriate instrumentation as discussed below.

In order to overcome the effects of pitching motions, which for most practical applications are the primary detriment to measurement accuracy, this invention utilizes a pair of accelerometers which are suitably mounted on the moving body so that their input axes lie in a plane, substantially vertically oriented with respect to a horizontal reference plane, passing through the center line of the moving aircraft body. The mounting structure is placed substantially at the yaw axis of the body so that rotations about the yaw axis of the aircraft have little or no effect on the forward acceleration measurement. Moreover, as mentioned above, rotation of the body about its roll axis will normally have little effect on such measurement unless the angle through which the aircraft rolls is relatively large. Even in cases where expected roll motion may be large, its effect can be reduced by the use of a pendulous mass as discussed below. The accelerometer pair is arranged so that their input axes intersect the forward direction at angles $\alpha$ and $\beta$, respectively, the value of such angles varying as the body rotates in one direction or the other about its pitch axis. The accelerometers are further fixedly arranged so that the quantity $(\alpha+\beta)$ is substantially equal to 90° and the output signals from such accelerometers are then utilized in an appropriate computation system, described in more detail below, to produce an accurate measurement of acceleration along the forward direction.

Figure 2:
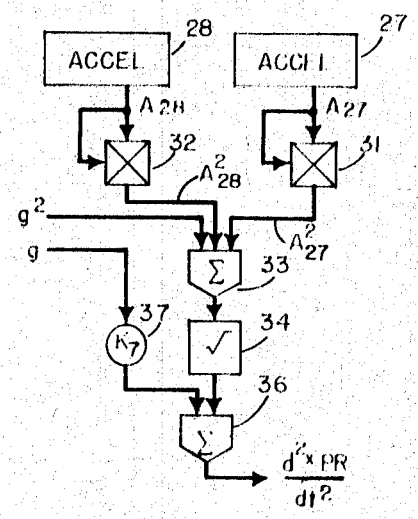

The operation of the invention can be understood more clearly with the help of the enclosed drawings in which:

FIG. 1 shows a partial cross-section of the accelerometer mounting system of the invention used to measure the acceleration of a moving body in a preselected direction; and FIG. 2 shows a block diagram of a computation system utilizing the output signals from such accelerometers to provide a computed signal representing the acceleration along such preselected direction.

In FIG. 1 the accelerometers utilized in the system are shown as they would be mounted, for example, in an aircraft for measuring the forward acceleration of such aircraft along a runway as the aircraft proceeds along its take-off run. In such structure two accelerometers 27 and 28 are suitably attached to a mounting structure 29 so that their input axes lie in a vertical plane along the center line of the aircraft and are substantially perpendicular to each other. A pendulous mass 30 is attached at the bottom of mounting structure 29 and operates to retain the accelerometer input axes in said vertical plane in the face of rotation of the aircraft about its roll axis and, thus, reduce the effects of rolling motion of the aircraft. Since a change in acceleration due to aircraft roll is a function of the cosine of the roll angle, small variations in the roll angle (i.e., the aircraft rolls no more than a few degrees in either direction from the vertical) produces minimal variations in accelerometer outputs. Thus, under conditions where the aircraft is expected to roll only very slightly during the take-off run, pendulous mass 30 may be omitted altogether without producing variations in the accelerometer output signals outside the desired accuracy specifications.

Accelerometers 27 and 28 each measure accelerations along the directions of their input axes, which axes are arranged at installation to form any appropriate fixed angles with the center line of the aircraft (so long as they are substantially perpendicular to each other, as mentioned above). During aircraft operation such input axes form angles $\alpha$ and $\beta$, respectively, with the horizontal axis and, consequently, while $\alpha$ and $\beta$ may vary during take-off due to pitching motions of the aircraft, the quantity $(\alpha+\beta)$ remains essentially equal to 90°. In the drawing, while the horizontal axis and the aircraft center line are shown as coinciding, such coincidence is not necessarily maintained during take-off.

With reference to FIG. 2, the output signal $A_{27}$ from accelerometer 27 is fed to the input terminals of a suitable multiplier circuit 31 which produces an output signal $A^2_{27}$ representing the square of the accelerometer input signal. The output signal $A_{28}$ from accelerometer 28 is similarly fed to the input terminals of a second multiplier circuit 32 for producing an output signal $A^2_{28}$. These signals are then fed to the input terminals of a suitable summation amplifier 33 together with a signal $g^2$ representing the square of the acceleration $g$ due to gravity. The output of summation amplifier 33 is then fed as an input signal to a suitable means 34 for obtaining the square root of such input signal, the output of means 34 thereby representing the present aircraft horizontal acceleration $$\frac{d^2 X_{PR}}{dt^2}$$

as measured in real-time, so long as the overall average slope of the runway is zero (i.e., the runway is essentially level). When the overall average slope of the runway is positive or negative, and appropriate correction factor equal to $(K_7 g)$ is introduced as shown. The signal $g$ is multiplied by $K_7$ at coefficient amplifier 35 and then fed to one input of summation amplifier 36 the other input of which is obtained from square-root means 34. The output of summation amplifier 36 thereby represents the acceleration corrected for runway slope characteristics.

The operation of the overall accelerometer computer sub-system shown in the block diagram of FIG. 2 is most easily understood with the help of the following equations where vertical aircraft accelerations are coupled to the horizontal by runway slope.

The output signals from accelerometers 27 and 28 may be written as follows:

$$A_{27} = g \sin \alpha + \frac{d^2 X_{PR}}{dt^2} (\cos \alpha) \quad (1)$$

$$A_{28} = g \sin \beta - \frac{d^2 X_{PR}}{dt^2} (\cos \beta) \quad (2)$$

where each of the symbols has been previously defined. Since $(\alpha+\beta)$ equals 90°, Eq. 2 can be rewritten as follows:

$$A_{28} = g \cos \alpha - \frac{d^2 X_{PR}}{dt^2} (\sin \alpha) \quad (3)$$

If Eqs. 1 and 3 are each squared and the results are added, the following expression is obtained:

$$A^2_{27} + A^2_{28} = g^2 (\sin^2 \alpha + \cos^2 \alpha) + \left(\frac{d^2 X_{PR}}{dt_2}\right)^2 (\sin^2 \alpha + \cos^2 \alpha) \quad (4)$$

Since $(\sin^2 \alpha + \cos^2 \alpha) = 1$, Eq. 4 can be simplified as follows:

$$A^2_{27} = A^2_{28} = g^2 + \left(\frac{d^2 X_{PR}}{dt^2}\right)^2 \quad (5)$$

The values of angles $\alpha$ and $\beta$ will vary as the aircraft rotates about its pitch axis. However, since the quantities $\alpha$ and $\beta$ are eliminated in Eq. 5, any changes in such angles due to minor pitching of the aircraft will not affect the accuracy of the measurement of aircraft acceleration which then can be expressed in accordance with the following equation:

$$\frac{d^2 X_{PR}}{dt^2} = \sqrt{A^2_{27} + A^2_{28} - g^2} \quad (6)$$

The functional mechanization of Eq. 6 is shown in the block diagram of FIG. 2 with an appropriate correction being subsequently made at summation amplifier 36 for runway slope as discussed above. Further minimization of the errors involved can be achieved by mounting the accelerometers on substantially non-vibratory structures so that the effect of vibrations is reduced.

Thus, FIG. 2 describes a computation system which utilizes the output signals from the dual-accelerometer system of FIG. 1 for measuring the acceleration of the moving body along a preselected direction which, in this particular embodiment, is the forward acceleration of the aircraft as it proceeds down the runway during its take-off run.

It is clear that such system will be useful in other applications wherever it is desired to measure the acceleration of a moving body along a preselected direction when the body is subjected to rotational motion about a specified axis. Moreover, modifications to the system of the invention may occur to those skilled in the art without departing from the spirit and scope of the invention. Hence, the invention is not to be construed as limited to the particular embodiment as described herein execept as defined by the appended claims.

What is claimed is:

1. A system for measuring the acceleration along a preselected direction of a moving body subject to acceleration due to gravity comprising
    means for providing a pair of signals representing the acceleration of said body along a pair of substantially mutually perpendicular axes, said axes intercepting said preselected direction at first and second angles, respectively, said axes lying in a plane substantially vertically oriented with respect to a horizontal reference plane;

means for generating a third signal representing the square of the acceleration of said body due to gravity; and means responsive to said pair of signals and to said third signal for producing an output signal representing the acceleration of said body along said preselected direction.

2. A system for measuring the acceleration of a body along a preselectesd direction in accordance with claim 1 wherein said output signal producing means includes first and second multiplier means responsive to said pair of signals for producing first and second multiplier signals representing the squares of each of said pair of signals;

means responsive to said first and second multiplier signals and to said third signal for producing an intermediate signal representing the sum of said first and second multiplier signals less said third signal; and means responsive to said intermediate signal for producing an output signal representing the square root of said intermediate signal, said output signal representing the acceleration of said body along said preselected direction.

means responsive to said first and second multiplier signals and to said third signal for producing an intermediate signal representing the sum of said first and second multiplier signals less said third signal; and means responsive to said intermediate signal for producing an output signal representing the square root of said intermediate signal, said output signal representing the acceleration of said body along said preselected direction.

3. A system for measuring the acceleration along a forward direction of a body subject to acceleration due to gravity and moving along a first plane, said system comprising a first accelerometer fixedly attached to said body so that its input axis intersects said forward direction at a first angle;

a second accelerometer fixedly attached to said body so that its input axis is substantially perpendicular to the input axis of said first accelerometer and intersects said forward direction at a second angle;

means for maintaining the input axes of said first and second accelerometers in a second plane substantially vertical with respect to a horizontal reference plane;

a first multiplier means coupled to said first accelerometer for producing a first multiplier signal representing the square of the output of said first accelerometer;

a second multiplier means coupled to said second accelerometer for producing a second multiplier signal representing the square of the output of said second accelerometer;

means for generating a third signal representing the square of the acceleration of said body due to gravity;

means responsive to said first and second multiplier signals and to said third signal for producing an intermediate signal representing the sum of said first and second multiplier signals less said third signal; and means responsive to said intermediate signal for producing an output signal representing the square root of said intermediate signal, said output signal representing the acceleration of said body along said forward direction.

4. A system for measuring the acceleration along a forward direction of a moving body subject to acceleration due to gravity and moving along a first plane, in accordance with claim 3, said system further including means for correcting the value of said output signal in accordance with the average slope of said first plane relative to said horizontal reference plane.

5. A system for measuring the acceleration along a forward direction of a body subject to acceleration due to gravity and moving along a first plane, in accordance with claim 4 wherein the sum of said first angle and said second angle is essentially ninety degrees.

References Cited
UNITED STATES PATENTS

| | | | |
|---|---|---|---|
| 2,613,071 | 10/1952 | Hansel | 73—490 |
| 3,071,008 | 1/1963 | Steele | 73—504 |
| 3,272,972 | 9/1966 | Yamron et al. | 235—150.25 |

JAMES J. GILL, Primary Examiner